US010035652B2

(12) United States Patent
Schnabl et al.

(10) Patent No.: US 10,035,652 B2
(45) Date of Patent: Jul. 31, 2018

(54) STORAGE SYSTEM HAVING A TRANSPORT SYSTEM FORMED BY MAGNETICALLY DRIVEN SHUTTLES

(71) Applicant: KNAPP AG, Hart Bei Graz (AT)

(72) Inventors: Roman Schnabl, St. Katharein an der Laming (AT); Roland Koholka, Lannach (AT)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 14/780,858

(22) PCT Filed: Feb. 27, 2014

(86) PCT No.: PCT/EP2014/053822
§ 371 (c)(1),
(2) Date: Sep. 28, 2015

(87) PCT Pub. No.: WO2014/161695
PCT Pub. Date: Oct. 9, 2014

(65) Prior Publication Data
US 2016/0052716 A1     Feb. 25, 2016

(30) Foreign Application Priority Data

Apr. 4, 2013 (EP) .................... 13162282

(51) Int. Cl.
*B65G 1/06* (2006.01)
*B65G 1/137* (2006.01)
(52) U.S. Cl.
CPC .......... *B65G 1/1378* (2013.01); *B65G 1/065* (2013.01)

(58) Field of Classification Search
CPC .............................. B65G 1/065; B65G 1/1378
(Continued)

(56) References Cited

U.S. PATENT DOCUMENTS 5,990,437 A    11/1999  Coutant et al.
6,513,641 B1    2/2003  Affaticati et al.
(Continued)

FOREIGN PATENT DOCUMENTS

CN     102161417 A  *  8/2011
EP      1 224 038 B1     7/2004
(Continued)

OTHER PUBLICATIONS

English translation, dated Oct. 15, 2015, of the Written Opinion in Int'l. Appln. No. PCT/EP20141053822.

*Primary Examiner* — Saul Rodriguez
*Assistant Examiner* — Ashley K Romano
(74) *Attorney, Agent, or Firm* — Merchant & Gould P.C.

(57) ABSTRACT

In a storage system with racks for storing products and with a first transfer device for transferring products to be stored in and removed from the racks from a transport system to a rack conveying system and with a second transfer device for transferring products removed from storage which have been transported with the transport system and, respectively, for receiving products to be stored and to be transported with the transport system, it is envisaged that the transport system includes rail-mounted shuttles which are individually controllable with regard to the transport direction and the transport speed and are configured for transporting the products removed from storage and the products to be put into storage between the first transfer device and the second transfer device across rails of at least one main loop.

9 Claims, 4 Drawing Sheets

(58) Field of Classification Search
USPC .......................................................... 414/273
See application file for complete search history.

(56) References Cited

U.S. PATENT DOCUMENTS

| | | | |
|---|---|---|---|
| 6,715,598 B2 | 4/2004 | Affaticati et al. | |
| 6,891,285 B2* | 5/2005 | Harned | H02K 41/031 |
| | | | 310/12.01 |
| 6,918,484 B2 | 7/2005 | Affaticati et al. | |
| 7,121,398 B2 | 10/2006 | Affaticati et al. | |
| 7,562,760 B2 | 7/2009 | Affaticati et al. | |
| 8,288,989 B2* | 10/2012 | Baba | B60L 11/1816 |
| | | | 180/65.29 |
| 8,948,909 B2 | 2/2015 | Ogawa et al. | |
| 2004/0197172 A1* | 10/2004 | Hansl | B65G 1/0485 |
| | | | 414/281 |
| 2010/0183409 A1* | 7/2010 | Checketts | B60K 17/30 |
| | | | 414/231 |
| 2014/0178161 A1* | 6/2014 | Moosburger | B65G 1/1378 |
| | | | 414/273 |

FOREIGN PATENT DOCUMENTS

| | | | |
|---|---|---|---|
| WO | 20121147261 A1 | 11/2012 | |
| WO | 20131033744 A1 | 3/2013 | |

* cited by examiner

STORAGE SYSTEM HAVING A TRANSPORT SYSTEM FORMED BY MAGNETICALLY DRIVEN SHUTTLES

FIELD OF THE INVENTION

The invention relates to a storage system with racks for storing products and with a first transfer device for transferring products to be stored in and removed from the racks from a transport system to a rack conveying system and with a second transfer device for transferring products removed from storage which have been transported with the transport system and, respectively, for receiving products to be stored and to be transported with the transport system.

BACKGROUND OF THE INVENTION

Document EP 1 224 038 B1 discloses such a storage system comprising a transport system for conveying and sorting products removed from the warehouse and products to be stored in the warehouse. The transport system comprises a circular conveyor which forms a main loop and on which the products are transported by means of a continuous member or a conveyor belt, respectively. Products which have been removed from the racks of the storage system are supplied to the circular conveyor via one of two feed conveyors which form secondary loops and the product streams of which are combined through a common deflector. In order to convey products supplied via the two feed conveyors at the deflector without collision to a free spot on the circular conveyor, the speeds of the feed conveyors and the circular conveyor must be changed constantly. As a result of differing transport speeds of the three conveyor belts, gaps are created between products, and the products are brought into the sequence as required for picking by being combined on the circular conveyor and discharged onto target conveyor belts.

The known storage system has turned out to be disadvantageous in that the permanent change in the speed of the three conveyor belts on which all products removed from the warehouse and all products to be stored in the warehouse are located will lead to high energy costs associated with the transport system, since large masses have to be decelerated and re-accelerated. Depending on the shape, weight and position of the products on the conveyor belts, a sudden deceleration or acceleration may cause products to get out of place or topple over on the conveyor belt or even to fall off from the conveyor belt. In order to avoid this, the transport system of the known storage system is able to decelerate and accelerate only relatively slowly. As a result, it takes longer for gaps to be created on the conveyor belts, whereby the hauling capacity and the sorting capacity of the known transport system are relatively low. In addition, the mechanism for synchronizing the conveyor belts with the circular conveyor is cost-intensive and takes up a lot of space because of the large number of individually actuatable conveyor belts. In order to achieve an economical solution, several retrieval paths of a rack must be combined in one infeed. Said combination is disadvantageous both in terms of space and with regard to the control technology.

BRIEF SUMMARY OF THE INVENTION

The invention is based on the object of creating a storage system in which the above-mentioned disadvantages are avoided. According to the invention, this problem is solved in that the transport system comprises rail-mounted shuttles which are individually controllable with regard to the transport direction and the transport speed and are configured for transporting the products removed from storage and the products to be put into storage between the first transfer device and the second transfer device across rails of at least one main loop.

At the second transfer device, a product which has been removed from a storage site of a rack by means of the rack conveying system is thus transferred to the transport system which is composed of unpowered and individually movable shuttles running on rails. Therein, each shuttle may be equipped with a separate autonomous drive. It is particularly advantageous, however, to drive the shuttles using a linear motor provided in the rails as they are controlled by a control device of the storage system.

As a result, the advantage is obtained that each shuttle is driven individually with regard to its transport speed and transport direction independently of other shuttles in the transport system. This enables a simple and efficient control of the individual shuttles either in order to establish a desired sequence of certain products on the transport system for the subsequent picking of the products or in order to convey certain products toward particular transfer devices in secondary loops. As a result of the fact that each time only individual shuttles are decelerated or accelerated, the transport system involves considerably lower energy costs than the known transport system. Furthermore, during the deceleration and acceleration of shuttles, the control device is able to take into account the type and the stability of the products on the respective shuttle, for which reason the products are prevented from toppling over or falling off from the transport system.

The main loop of the transport system now exhibits at least one secondary loop which can be used as an overtaking loop for passing shuttles or as a buffer station for depositing shuttles. Advantageously, branches are provided in the main loop which permit a shortcut of the transport path. As a result of those secondary loops being provided, the products are located on the transport system only for a relatively short time, for which reason the throughput of products transportable with the transport system can be increased.

By moving the shuttle loading and unloading to secondary loops, the advantage also arises that the loading and unloading of the shuttles can take place at lower speeds of the shuttles without reducing the entire throughput of the system. Since, with such an arrangement, only shuttles with products which must be unloaded in this secondary loop will arrive at the transfer device for unloading, the latter can be designed in a particularly simple manner.

Further advantageous embodiments of the storage system according to the invention are illustrated in further detail below on the basis of the figures.

DETAILED DESCRIPTION OF THE INVENTION

Figure 1:
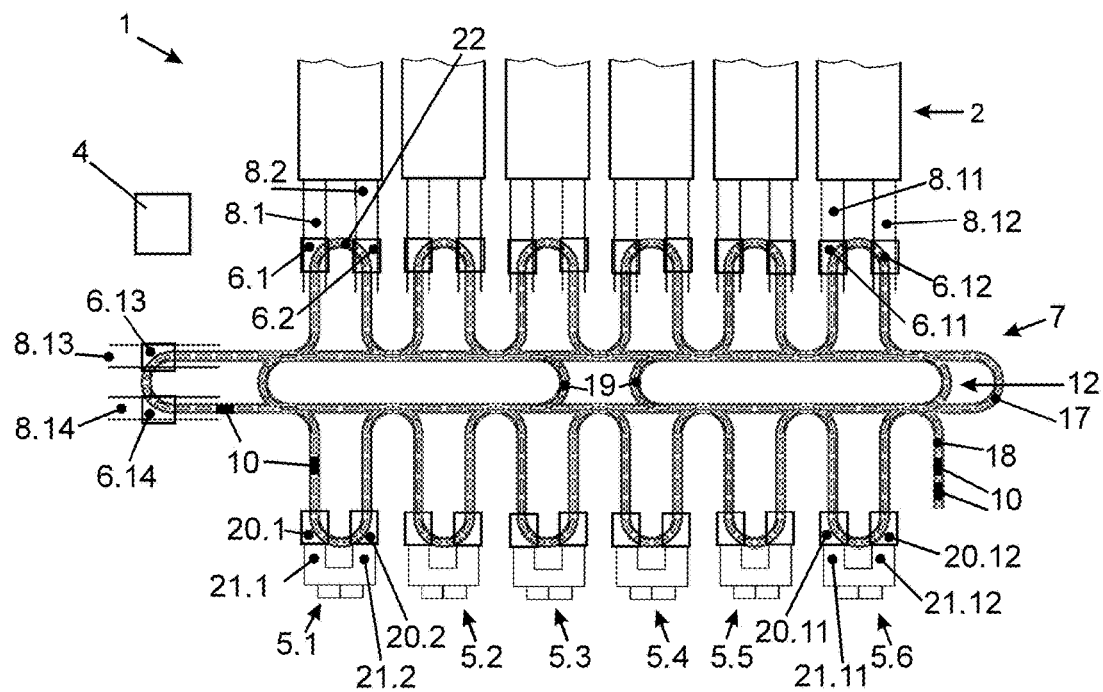
FIG. 1 schematically shows a detail of the layout of a storage and order-picking system comprising a picking station that is operated unmanned.

FIG. 1 shows a storage system 1 with racks 2 for storing products. The racks 2 have several levels and, per level, a plurality of storage sites are provided in which products are stored in boxes 3. A higher-ranking control device 4 manages the products in the storage system 1 and actuates all the facilities described below in order to store products in the storage system 1 and to convey products stored in the storage system 1 to goods-to-picker order-picking stations 5.1 to 5.6. At those goods-to-picker order-picking stations 5.1 to 5.6, pickers remove the number of products as specified for a picking order and put them into an order container.

In order to convey the products intended for a picking order to the goods-to-picker order-picking station 5.1 to 5.6 intended for the picking order in a sequence as desired for packing the products, the control device 4 removes the products intended for picking from the storage sites of the racks 2 in a particular sequence and transfers them to a transport system 7 at transfer devices 6.1, 6.3, 6.5, 6.7, 6.9, 6.11. So-called level-operating devices on each level of the racks 2 convey the products removed from storage to lifts of the respective racks 2, which convey the products removed from storage onto materials handling equipment arms 8.1, 8.3, 8.5, 8.7, 8.9, 8.11. Products delivered to the storage system 1 and to be stored in the storage system 1 are supplied to the storage system 1 via a materials handling equipment arm 8.14 and a transfer device 6.14 and are supplied to the storage system 1 via the transfer devices 6.2, 6.4, 6.6, 6.8, 6.10, 6.12 and the materials handling equipment arms 8.2, 8.4, 8.6, 8.8, 8.10, 8.12. Products removed from storage which are to be dispatched through different paths are delivered from the transport system 7 to a materials handling equipment arm 8.13 via a transfer device 6.13.

According to the present exemplary embodiment, the main direction of motion in the main loop 12 is anti-clockwise, which results in the respective associated transfer devices and materials handling equipment arms for storing in and removing from the racks 2. According to another exemplary embodiment, the main direction of motion in the main loop 12 could also be set in a clockwise direction, whereby the respective associated transfer devices and materials handling equipment arms for storing in and removing from the racks 2 would be determined differently. It is particularly advantageous that, if necessary, individual shuttles 10 can be transported anytime across the main loop 12 as wrong-way drivers against the main direction of motion.

Figure 2:
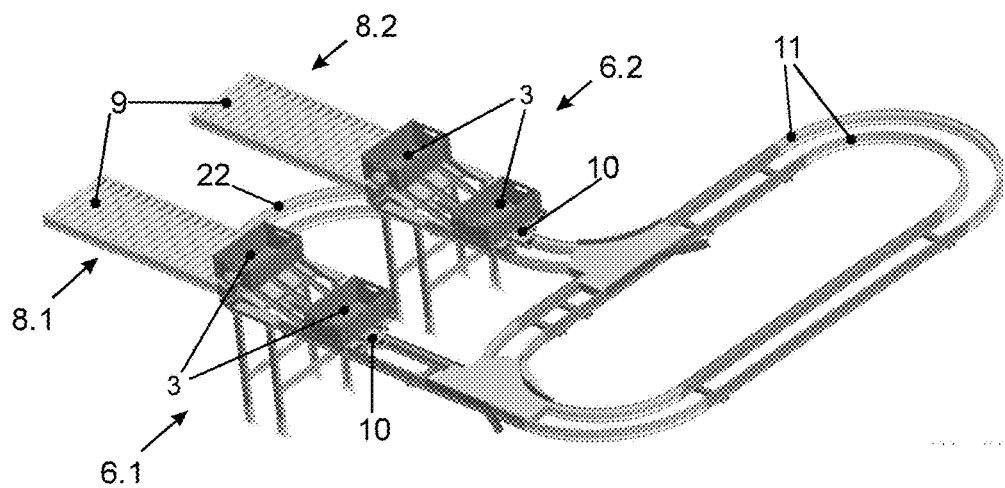
FIG. 2 shows ramps as transfer devices between a materials handling equipment with driven pulleys and a transport system with rail-mounted shuttles.

The materials handling equipment arms 8.1 and 8.2 exemplified in further detail in FIG. 2 are provided on every rack aisle of each rack 2 and comprise pulleys 9 in order to convey the boxes 3 removed from storage with the products to the transfer devices 6.1 and 6.2 or to receive them from there. The transfer devices 6.1 to 6.12 are formed by ramps by means of which the boxes 3 are loaded onto shuttles 10 by the materials handling equipment arms 8.1 to 8.12, which will be addressed in further detail below. In doing so, the transfer devices 6.1 to 6.12 also constitute receiving devices for receiving products on the transport system 7 and dispensing devices for dispensing products from the transport system 7.

The transport system 7 now comprises rail-mounted shuttles 10 which are individually controllable with regard to the transport direction and the transport speed and are configured for transporting the products removed from storage and the products to be put into storage between the transfer devices 6.1 to 6.14 and further transfer devices 20.1-20.12 as well as 8.13 and 8.14 across rails 11 of at least one main loop 12. For driving the shuttles 10, the transport system 7 has a direct magnetic drive which is formed from a plurality of individually actuatable linear motors 13.1 to 13.4 arranged on the rails 11, as exemplified in further detail in FIG. 4. The individual linear motors 13.1 to 13.4 are actuated timely by the control device 4 and thereby form a linear motor 14 for driving the individual shuttles 10 with regard to the transport path, the transport speed and the transport direction, which linear motor is homogeneously actuatable for the control device 4 at a higher level.

Figure 4:
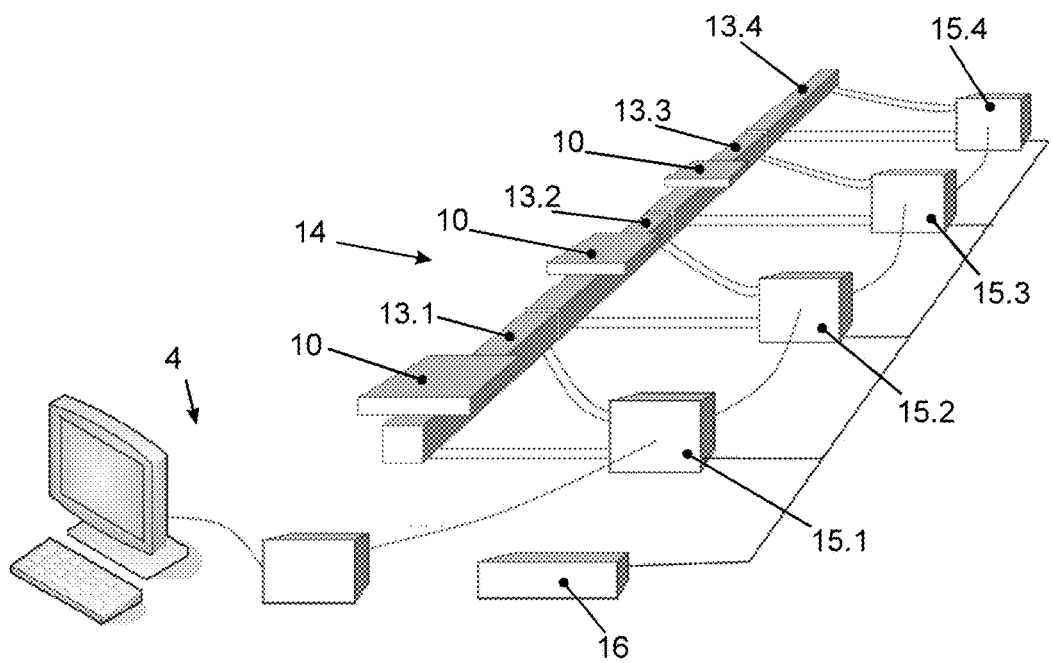
FIG. 4 shows several individually actuatable linear motors of the transport system according to FIG. 1 with a control device.

In FIG. 4, the higher-ranking control of the linear motors 13.1 to 13.4 arranged between the rails 11 by the control device 4 is illustrated symbolically, wherein the linear motors 13.1 to 13.4 have a length of, for example, 0.5 meters. Each of the linear motors 13.1 to 13.4 comprises several solenoids arranged in the longitudinal direction, to which a motor control unit 15.1 to 15.4 is allocated, which are supplied with energy by an energy supply unit 16 and are actuated by the control device 4. As can be see in FIG. 6, the shuttles 10 comprise permanent magnets 17 and are driven by the magnetic field generated by the solenoids. For transporting a shuttle 10 across the rails 11 of the transport system 7, a hardware layer of the software of the control device 4 actuates the individual linear motors 13.1 to 13.4 in the time and space sequence as required therefor. A transport layer of the software of the control device 4, which transport layer is located on top of that in organizational terms, is thus able to actuate the linear motor 14 of the transport system 7 as a uniform linear motor 14 for driving and decelerating the individual shuttles 10.

As a result, substantial advantages arise for the storage system 1, since the control device 4 is able to determine the optimal transport path for every shuttle 10. On said transport path, the shuttle 10 can be directed into secondary loops such as the overtaking loop 17 and can be overtaken by other shuttles 10 in order to convey the products removed from storage to the intended goods-to-picker order-picking station 5.1 to 5.6 in the desired sequence. An intermediate storage on a secondary line 18 exhibiting buffer stations is also advantageous for conveying products removed from storage a short while after having been picked, for example, at the goods-to-picker order-picking station 5.2 to the goods-to-picker order-picking station 5.5 for another picking order without, in the meantime, having to store the product again in rack 2. The secondary line may also be used for parking shuttles 10 not in use or faulty shuttles 10.

It is also particularly advantageous to provide branches 19 in the main loop 12 which permit a shortcut of the transport path of the main loop 12, for example, if a product removed from storage is to be stored in rack 2 via the main loop 12 and the first transfer device 6.2 after having been picked at the goods-to-picker order-picking station 5.1. Through the individual control of each shuttle 10 with a product located on it, a particularly efficient transport is possible between the transfer devices 6.1 to 6.14 and the transfer devices 20.1 to 20.12 at the goods-to-picker order-picking stations 5.1 to 5.6. The transfer devices 20.1 to 20.12 are likewise formed by ramps in order to load the products removed from storage, which have been brought into the desired sequence, from the shuttles 10 onto a dispensing materials handling equipment 21.1 to 21.12, from which the products removed from storage are conveyed to the goods-to-picker order-picking stations 5.1 to 5.6 and, from there, are redelivered to the transport system 7. The dispensing materials handling equipment 21.1 to 21.12 also comprises pulleys 9, as they are illustrated in FIG. 2 for the materials handling equipment arms 8.1 and 8.2.

For the above-mentioned reasons, it has turned out to be advantageous to provide the linear motor 14 as a drive for the transport system 7. It has turned out to be beneficial for the materials handling equipment arms 8.1 to 8.12 to employ a conventional materials handling equipment, since the required buffer stations for decoupling the rack conveying device and the shuttles 10 can be implemented in a more space-saving and cost-efficient manner. However, for the dispensing and receiving materials handling equipment 21.1 to 21.12, it has turned out to be advantageous to employ a conventional materials handling equipment, since it is possible on said equipment to rotate the boxes 3 with regard to the transport direction. In this way, it is possible to design the order-picking stations 5.1 to 5.6 in an ergonomically optimal form.

Figure 3:
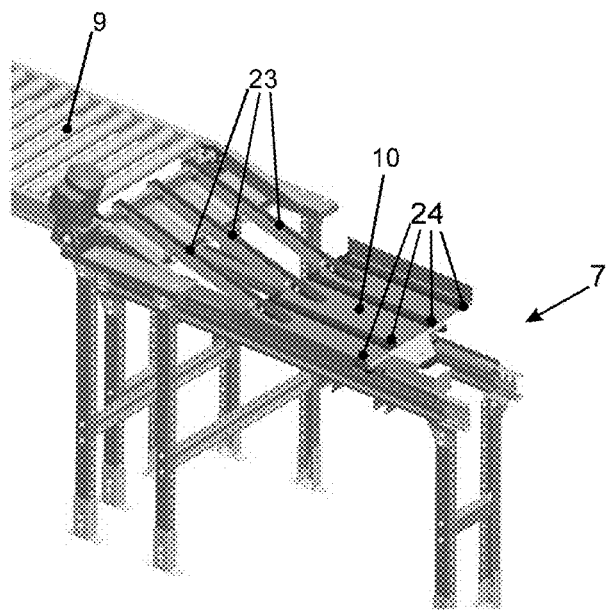
FIG. 3 shows one of the ramps according to FIG. 2 with a shuttle on the transport system.

In this exemplary embodiment, ramps as illustrated in FIGS. 2 and 3 are provided as transfer devices arranged in the secondary loops. As can be seen in FIG. 2, the secondary loop 22 comprises two ramps for conveying the shuttles 10 which are empty after the boxes 3 have been delivered to one ramp as far as to the other ramp in order to load other boxes 3 onto the empty shuttles 10 there. As a result, the transport paths of empty shuttles 10 can be kept particularly short, which is advantageous for relieving the transport system 7. Hence, it is also particularly advantageous to provide in each secondary loop at least one receiving/dispensing device or, respectively, transfer device and, if possible, both a receiving device and a dispensing device or, respectively, two transfer devices. As a result, the transport paths with empty shuttles 10 can be kept particularly short.

The ramps are designed so as to be stationary to such an extent and comprise only one driven transport belt per ramp arm 23 so that a shuttle 10 can move underneath the stationary ramp for being loaded with boxes 3 containing products removed from storage. In doing so, the shuttle 10 moves underneath ramp arms 23 via which the boxes 3 are conveyed downwards when the shuttles 10 are being loaded. When the shuttles 10 are being unloaded, the box 3 is pushed from the shuttle 10 driven by the linear motor 14 onto the ramp arms 23 by retaining lugs 24 of the shuttle 10, which are clearly visible in FIGS. 8 and 9, and is conveyed from there upwards to the conventional materials handling equipment. Owing to the appropriate height adjustment of the ramp arms 23 so that the shuttle 10 can pass through underneath, the ramp arms 23 and thus the entire ramp can be designed without any displaceable parts, which is particularly advantageous with regard to the reliability and the service life of the ramp. It is likewise advantageous that the individual ramp can be used in both transport directions and thus for the transfer from the transport system 7 and for the transfer onto the transport system 7.

The ramps have an ascending slope for delivering products from shuttles 10 of the transport system 7 to the conventional materials handling equipment, and the ramps have a downward slope for receiving products from the conventional materials handling equipment on shuttles 10 of the transport system 7. Furthermore, the control device 4 for the transport of the shuttles 10 is designed for dispensing the transported products from the shuttles 10 at a higher speed than the transport belts of the ramp arms 23. As a result, the boxes 3 are advantageously pushed onto the ramp arms 23 reliably and without twisting. When the products are delivered to a shuttle 10, said speed difference is depicted in a reverse way, which will advantageously lead to the shuttles 10 being loaded safely without the products being twisted.

Figure 5:
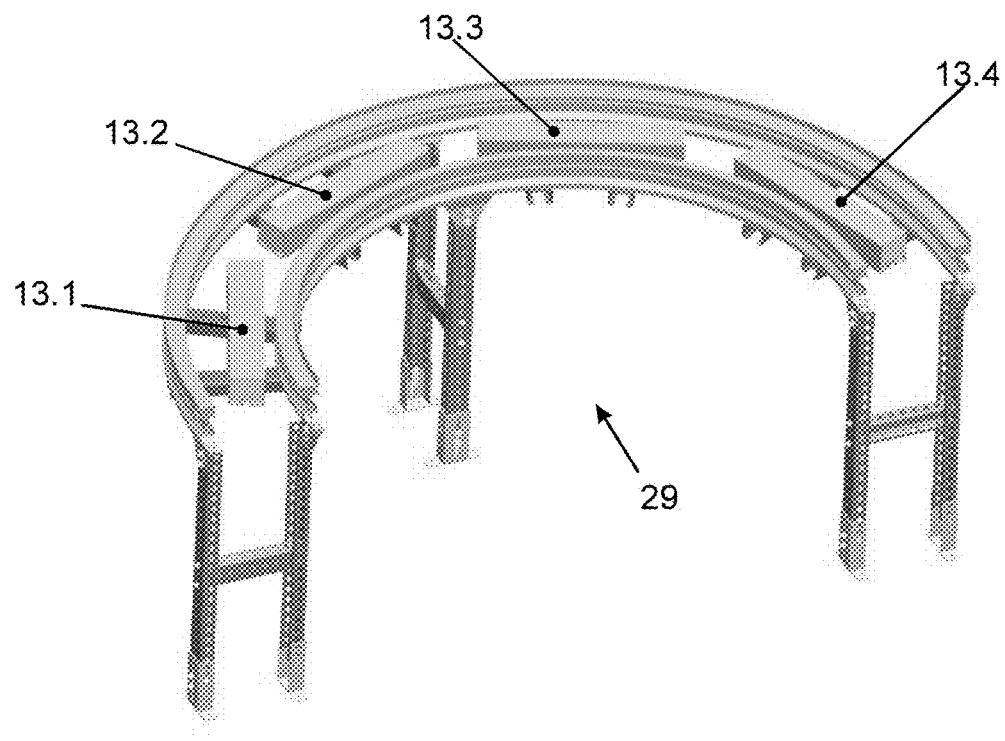
FIG. 5 shows a curved rail of the transport system according to FIG. 1 with several individually actuatable linear motors.
Figure 6:
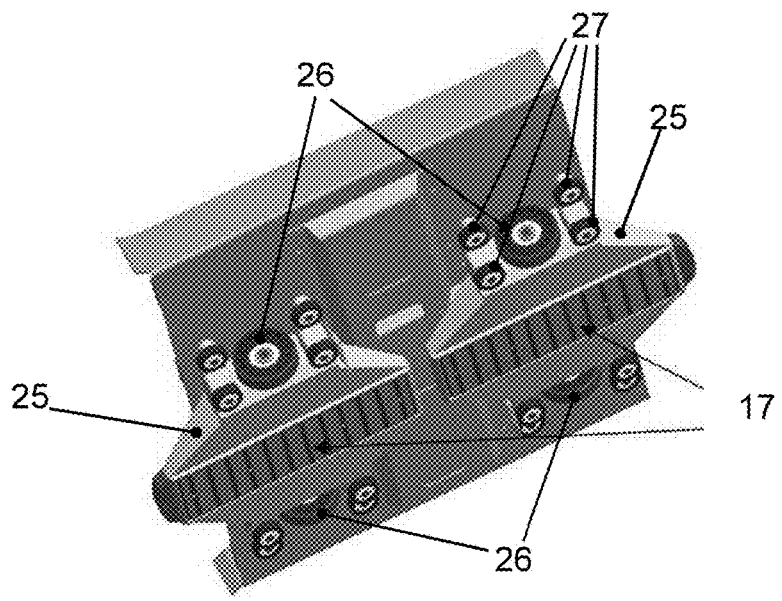
FIG. 6 shows a shuttle of the transport system according to FIG. 1 in an oblique view from below.

FIG. 6 shows a shuttle of the transport system 7 according to FIG. 1 in an oblique view from below. The permanent magnets 17 arranged in the middle of the shuttle 10 are mounted on two rotary tables 25, each comprising main pulleys 26 for passing on the burden to the rails 11 and guide pulleys 27 for guiding the shuttle 10 along the straight lines and the curves and the branching means or deflectors 28, respectively. The result of the attachment of the permanent magnets 17 on the pivotable rotary tables 25 is a particularly good covering of the permanent magnets 17 with the linear motors 13.1 to 13.4 when the shuttle 10 moves through a curved rail 29 as illustrated in FIG. 5. As a result, the shuttles 10 are driven reliably and consistently also on curved rails 29 and at deflectors 28. Due to the shuttles 10 being constructed symmetrically with regard to their two possible transport directions, they can be used equally well for a transport in both transport directions independently of the direction. Being controlled by the control device 4, the shuttles 10 are thus able to reverse their transport direction at any time and are thus also able to move as wrong-way drivers against the main transport direction on the main loop 12 or on one of the secondary loops. This flexibility allows particularly short transport paths.

Figure 8:
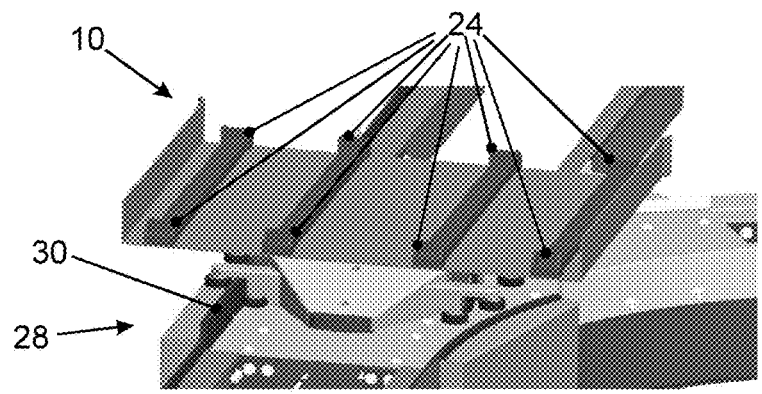
FIG. 8 shows the shuttle according to FIG. 6 on a deflector of the transport system during a straight-ahead movement.
Figure 9:
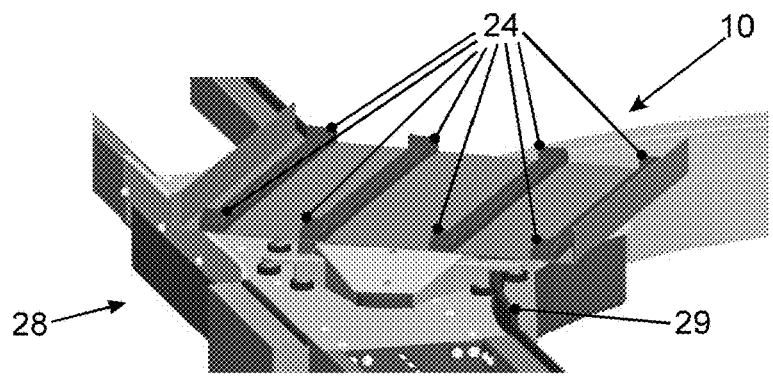
FIG. 9 shows the shuttle according to FIG. 6 on a deflector of the transport system during a movement along curves.

In FIGS. 8 and 9, a shuttle 10 is illustrated on the deflector 28 during a straight-ahead movement and during a movement along curves. Depending on the transport path provided by the control device 4, the control device actuates steering means 29 and 30 of the deflector 28. In order to have the shuttle 10 move straight ahead across the deflector 28, the steering means 29 are lowered and the steering means 30 are raised, and vice versa for a movement along curves. The steering means 29 or 30 which are raised in the given situation engage with the guide pulleys 27 and thus steer the shuttle 10 into the desired direction. The result is a particularly reliable and simple type of deflector 28. According to another embodiment, the deflectors would be able to displace steering means also laterally in order to divert shuttles for a straight-ahead movement or a movement along curves.

Figure 7:
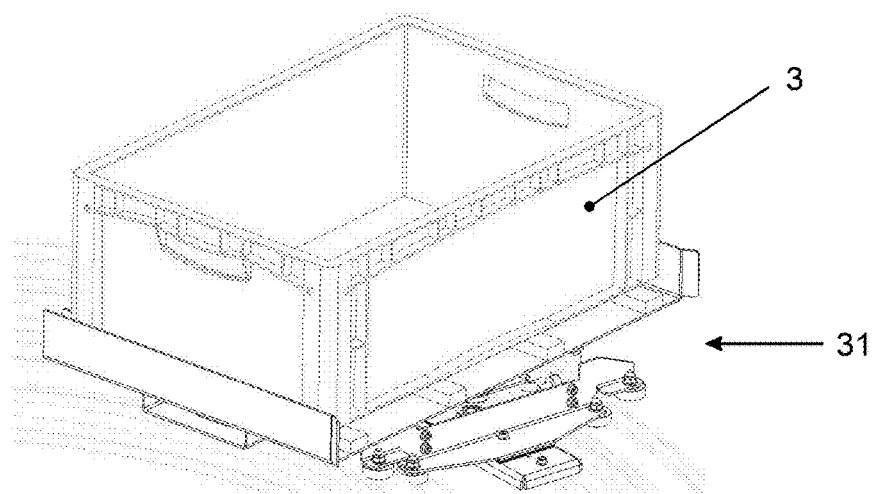
FIG. 7 shows another type of shuttle for a transport system with a box in which products are contained.

FIG. 7 shows another type of shuttle 31 for a transport system with a box 3 in which products are contained. This shuttle 31 has no retaining lugs and a different type of pivotable rail guidance. According to the invention, further differing embodiments of shuttles are feasible.

The transport system 7 according to FIG. 1 comprises position sensors, which are not illustrated further in the figures, along the rails 11, which position sensors are formed by hall effect sensors the sensor information of which is evaluated by the control device 4 for determining the current position of each shuttle 10. The position sensors are arranged in parallel to the motor windings of the linear motors 13.1 to 13.4 and detect the individual shuttle 10. As a result, it is advantageously ensured that the control device 4 knows at any time precisely where which shuttle 10 is located on the transport system 7. On the basis of this position information, the motor controls 15. to 15.4 located on the transport path can be actuated timely.

Furthermore, the control device 4 is designed for allocating a revolving transport window to each shuttle 10, wherein the shuttle 10 can be decelerated and accelerated by the control device 4 within the transport window. Within the transport window, the shuttle 10 can be decelerated by the control device 4 in order to receive products on the shuttle 10 or in order to convey the shuttle 10 through a curve of the main loop 10 or the deflector 28. Furthermore, it is possible to accelerate within the transport window in order to enable the shuttle 10 to move slowly for an extended period of time as preparation for a loading or unloading operation or in order to allow larger differences between the transport speed and the loading speed, respectively. By providing the transport window, on the one hand, the area in the transport system 7 in which the respective shuttle 10 is located at a particular time is clearly defined by the control device 4 and, on the other hand, sufficient flexibility is provided for a locally required deceleration or acceleration.

In the transport system 7, the control device 4 is furthermore designed for deactivating a route section of the transport system 7 in case an error or a maintenance requirement occurs in a shuttle 10. Furthermore, the control device 4 is able to discharge faulty shuttles 10 into secondary loops at any time, if necessary. As a result, it is advantageously achieved that, in case of abnormal occurrences or of maintenance works, the normal operation of the transport system 7 can be continued essentially without hindrance.

It may be mentioned that transfer devices and, respectively, dispensing and receiving devices may also be constituted by the lift in one of the racks of the storage system or by other elements which are common in the field of storage and picking systems.

It may be mentioned that, in a storage system according to a further exemplary embodiment, each shuttle can be equipped with a separate autonomous drive. The drive may be formed by an electric motor which is fed by an accumulator, wherein a control device of the shuttle would detect a low state of charge of the accumulator and would steer the shuttle to a charging station in due time. As an alternative to the accumulators, the energy supply may also be accomplished with busbars arranged alongside the rails and sliding contacts on the shuttle.

It may be mentioned that products are understood to be any type of transported materials such as, for example, containers or cardboard boxes. Rail-mounted shuttles are furthermore understood to be any type of shuttles which are moved or, respectively, transported mechanically or electromechanically and which do not exhibit a separate controlled steering device for presetting the transport path.

The invention claimed is:

1. A storage system comprising:
   racks for storing products;
   at least two first transfer devices for transferring products, which are to be stored in and removed from the racks, from a transport system to a rack conveying system; and
   at least two second transfer devices for transferring products removed from storage which have been transported by the transport system and for receiving products to be stored and to be transported by the transport system,
   wherein the transport system includes unpowered rail-mounted shuttles driven by a linear motor mechanically coupled to rails, the shuttles being drivable in a plurality of transport directions including a first transport direction and a second transport direction opposite to the first transport direction, and drivable among a plurality of transport speeds,
   wherein the linear motor is controllable so as to individually control each one of the shuttles with regard to (i) a transport direction, among the first transport direction and the second transport direction, and (ii) a transport speed, among the plurality of transport speeds,
   wherein the first transfer devices and the second transfer devices are arranged in secondary loops, wherein rails of the secondary loops branch off from rails of a main loop via branches provided between each secondary loop and the main loop, and wherein, in order to minimize transport paths of empty shuttles, in at least one secondary loop at least one first transfer device is arranged for transferring and at least one first transfer device is arranged for receiving products, and/or in at least one secondary loop at least one second transfer device is arranged for transferring and at least one second transfer device is arranged for receiving products, and
   wherein the shuttles are configured for transporting the products removed from storage and the products to be put into storage between the first transfer device and the second transfer device across rails of the main loop.

2. A storage system according to claim 1, wherein a control device is provided which individually actuates each shuttle of the transport system with regard to the transport path, the transport speed and the transport direction for establishing a desired sequence of products removed from storage or for conveying products removed from storage to the desired transfer device.

3. A storage system according to claim 1, wherein branches are provided in the main loop which permit a shortcut of the transport path of the main loop.

4. A storage system according to claim 1, wherein the transport system exhibits at least one overtaking loop on the main loop and is configured for establishing a desired sequence for conveying individual shuttles with a different transport speed or a different transport direction.

5. A storage system according to claim 1, wherein the transport system includes at least one buffer station in which shuttles can be temporarily stored and overtaken by other shuttles in order to establish a desired sequence.

6. A storage system according to claim 1, wherein at least one goods-to-picker order-picking station is provided for picking the products removed from storage which have been brought into a desired sequence into an order container, and
   wherein the products which have been brought into the desired sequence are transferred from the transport system at least one of the second transfer devices to dispensing materials handling equipment for transport to the at least one goods-to-picker order-picking station.

7. A storage system according to claim 1, wherein the first transport direction is a main transport direction and the second transport direction is a wrong-way direction.

8. A storage system according to claim 1, wherein the transport system is configured for magnetically driving the shuttles by means of a linear drive.

9. A storage system according to claim 1, wherein a transfer device to the transport system is provided on every rack aisle of the storage system.

* * * * *